A. R. CORRINGTON.
HAND PLOW.
APPLICATION FILED AUG. 14, 1909.
959,425.
Patented May 24, 1910.
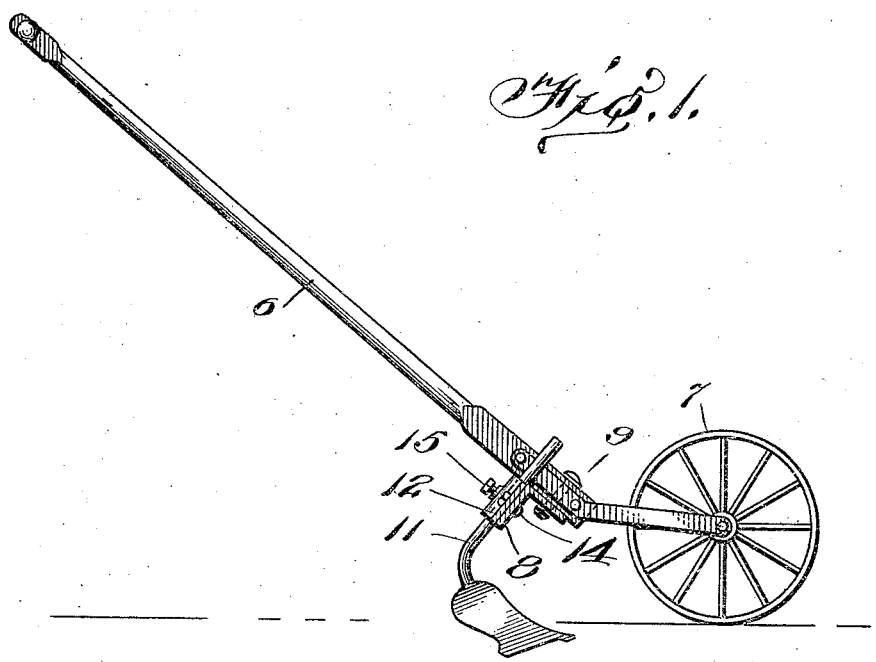
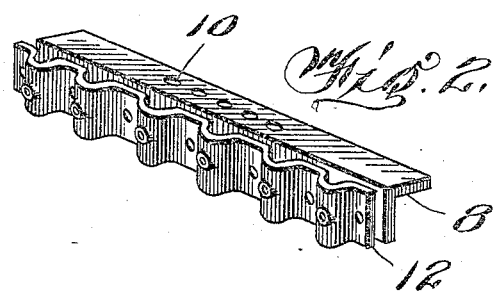

UNITED STATES PATENT OFFICE.

ALDON R. CORRINGTON, OF HARTLEY, IOWA.

HAND-PLOW.

959,425.  Specification of Letters Patent.  Patented May 24, 1910.

Application filed August 14, 1909. Serial No. 512,830.

*To all whom it may concern:*

Be it known that I, ALDON R. CORRINGTON, citizen of the United States, residing at Hartley, in the county of O'Brien and State of Iowa, have invented certain new and useful Improvements in Hand-Plows, of which the following is a specification.

This invention relates to hand implements, such as cultivators and plows particularly useful in tilling gardens and the like, and has for its object to provide improved means for holding and adjusting one or more blades or tools so that the implement may be adapted for a variety of uses, the proper blade, tool or tools being adjusted according to the nature of the work at hand.

The invention is characterized particularly by an improved clamp and support which allows the tool to be set or adjusted at various heights and angles, as will more fully appear from the following description.

The invention is illustrated in the accompanying drawing in which:
Figure 1 is a side elevation of the implement; Fig. 2 is a perspective view showing the means for holding the blades or tools.

Referring specifically to the drawings, 6 indicates the handle or stock of the implement provided at its front end with a ground wheel 7, as usual. To the lower end of the stock is attached an angle-iron 8, by means of a bolt 9, one flange of the angle-iron being clamped by a bolt to the under side of the stock, and the other flange depending, as shown. This angle-iron extends transversely with respect to the stock. By providing a series of holes 10 for the bolt 9, the angle-iron may be shifted laterally with respect to the stock, if desired, but this will ordinarily be unnecessary.

The plow, or other tool or blade, is provided with a circular shank or stem 11, which is clamped to the depending flange of the angle-iron by means of the plate 12 which is provided with a series of corrugations 13, in any one of which the shank 11 may be clamped. The plate 12 is fastened to the depending flange of the angle-iron by means of bolts 14 located between the corrugations, and the shank 11 is held at the desired position by means of a screw 15. Obviously the number of tools may be increased or decreased as desired. Thus to make a cultivator, a series of cultivator teeth may be attached to the angle-iron, the shank of each tooth being held in the appropriate socket or corrugation 13. The shank 11 of the tool or blade used may be adjusted vertically to vary the depth of the tool, and it may be lowered or adjusted angularly to vary the inclination at which the blade is presented to the soil. This double adjustment will be found very useful in setting the tools according to the crops being worked, and the utility of the implement is further increased by the possibility of using more or less tools as desired. A pair of plows, for example, may be set at opposite ends of the cross piece 8, to work on side rows, or two tools may be set near one end of the cross piece, to work on opposite sides of the same row. Various other uses of the implement will occur to those skilled in the art.

A further advantage of the implement is its simplicity and the cheapness in which the parts may be constructed. The clamping devices may be assembled out of ordinary commercial stuff, except possibly the corrugated plate 12, which can be pressed or cast specially.

I claim:

1. An implement having a beam, a cross piece angular in cross section, extending across under the beam, one flange of said cross piece being fastened to the beam, a clamping plate secured to and extending along the other flange of the cross piece and provided with recesses on the side adjacent to the cross piece to receive the shanks of blades or tools, means to secure the clamping plate to the flange of the cross piece, and means to adjustably hold said shanks in said recesses.

2. An implement having a beam, a cross piece extending across and fastened to the beam and having a depending flange, a clamping plate extending along one side of the flange and provided with cross corrugations forming a series of recesses on the side adjacent to said flange, to receive the shanks of blades or tools, adjustable clamping devices releasably connecting the plate and flange and located between said recesses whereby the space between the plate and flange may be varied to receive shanks of different sizes, and means to hold said shanks in said recesses.

3. An implement having a beam, an angle iron having one flange secured to and extending across said beam and the other flange depending below said beam, a clamping plate secured to and extending along said depending flange, and means to clamp the shanks of tools or blades between said plate and depending flange.

In testimony whereof, I affix my signature in presence of two witnesses.

ALDON R. CORRINGTON.

Witnesses:
C. L. CORRINGTON,
G. E. KNAACK.